US005188247A

United States Patent [19]

Jastrow

[11] Patent Number: 5,188,247

[45] Date of Patent: Feb. 23, 1993

[54] LIFTING APPARATUS

[76] Inventor: Keith Jastrow, 28314 Hillfield La., Canyon County, Calif. 91351

[21] Appl. No.: 787,812

[22] Filed: Nov. 4, 1991

[51] Int. Cl.[5] .................... B60P 1/48

[52] U.S. Cl. .................... 212/140; 212/257; 212/261; 212/265

[58] Field of Search .................... 212/254, 255, 261, 265, 212/187, 205, 140, 257; 414/626; 294/81.3, 86.4; 254/281

[56] References Cited

U.S. PATENT DOCUMENTS

| | | | |
|---|---|---|---|
| 2,804,979 | 9/1957 | Lassiter | 212/265 |
| 3,275,296 | 9/1966 | Meyer | 212/265 |
| 3,433,459 | 3/1969 | Logan | 212/187 |
| 3,855,954 | 12/1974 | Quick | 212/257 |
| 4,090,625 | 5/1978 | Walters | 212/265 |
| 5,076,448 | 12/1991 | Ballard | 212/265 |

*Primary Examiner*—Jesus D. Sotelo
*Assistant Examiner*—Stephen P. Avila
*Attorney, Agent, or Firm*—J. E. Brunton

[57] ABSTRACT

A lifting apparatus that permits an object to be precisely lifted in a highly safe manner along a number of selected paths. The object to be lifted can be vertically raised along selected transversely spaced paths by vertically raising the lifting arms of the apparatus and can alternatively, or simultaneously, be pivotably lifted by imparting a pivotal, upward movement of the lifting arms relative to the base assembly. The cable or chain which actually lifts the engine is connected to a carriage that reciprocates along tracks which transversely span the lifting arms. In this way the lifting path can be varied either to the right or left.

14 Claims, 6 Drawing Sheets

FIG. 5
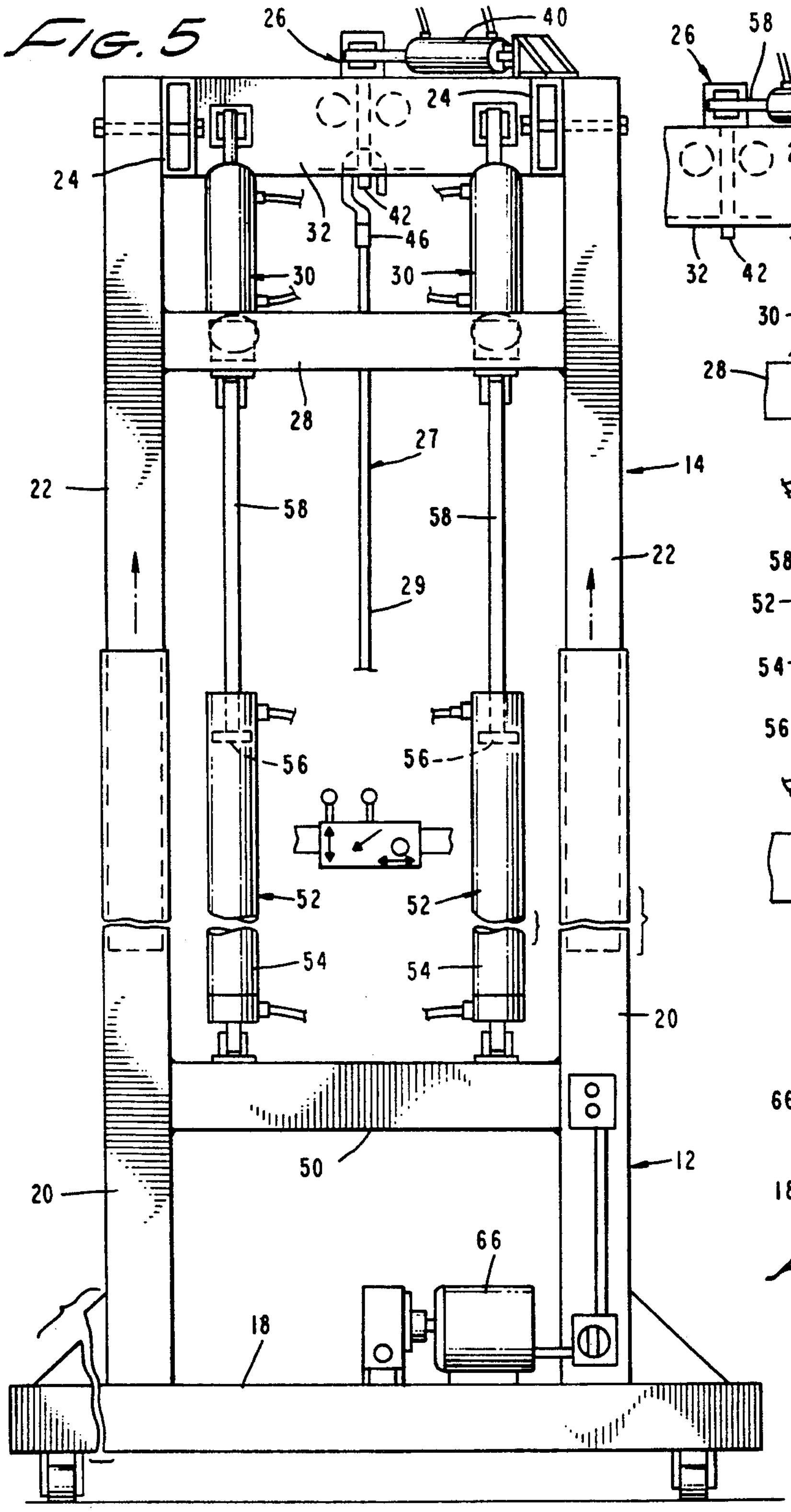
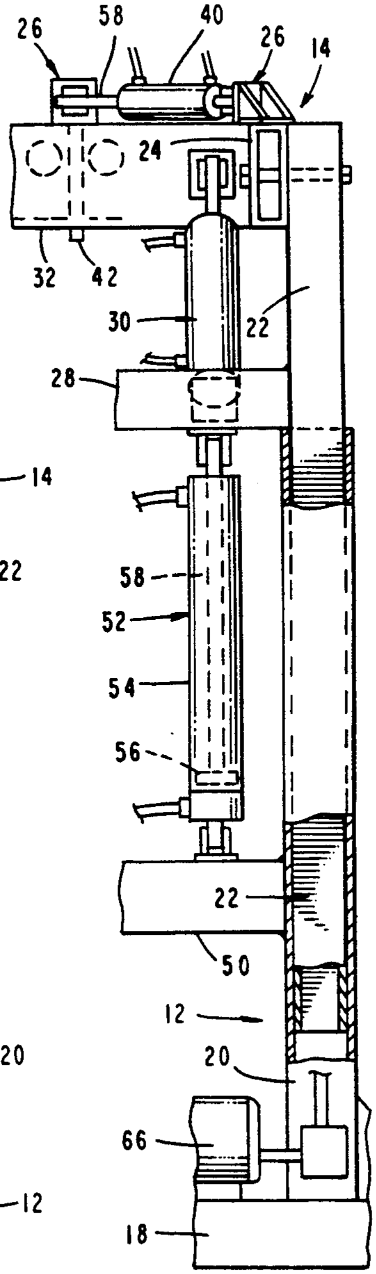
FIG. 6

LIFTING APPARATUS

BACKGROUND OF THE INVENTION

1. Field of the Invention

The present invention relates generally to lifting apparatus. More particularly the invention concerns a novel engine hoist for removing engines from vehicles.

2. Discussion of the Invention

Numerous types of lifting devices have been suggested for controllably lifting all sorts of objects. Most of the smaller, portable prior art lifting devices are hydraulically operated and find wide use in the automotive repair industry. A common use of such devices is for lifting engines from cars and trucks so that they can be repaired or replaced.

The standard prior art engine hoist typically comprises a base assembly, usually mounted on rollers, and an upper assembly which is operably connected to the base assembly. As a general rule, one or more forwardly extending lifting arms are pivotally connected to upright columns provided on the base assembly and, in conjunction with a chain or cable, function to perform the lifting operation. Generally a standard hydraulic assembly is used to impart pivotally movement to the lifting arms.

Most of the prior art engine hoists are relatively crude and often are difficult and dangerous to work with. A particular problem inherent in these prior art devices is their inability to accurately and controllably lift the engine along a selected lifting path so that the engine can be lifted from the engine compartment without damage. The lifting apparatus of the present invention uniquely overcomes the drawbacks of the prior art engine hoists by providing a lifting apparatus that permits an object to be precisely lifted in a highly safe manner along a number of selected paths. More particularly the object to be lifted can be vertically raised along selected transversely spaced paths by vertically raising the lifting arms of the apparatus and can alternatively, or simultaneously, be lifted along longitudinally spaced apart paths by imparting a pivotal, upward movement of the lifting arms relative to the base assembly. The cable or chain which actually lifts the engine is connected to a carriage that reciprocates along tracks which transversely span the lifting arms. In this way the lifting path can be varied either to the right or left as the engine is lifted from the engine compartment.

SUMMARY OF THE INVENTION

It is an object of the present invention to provide a lifting apparatus for precisely lifting various types of objects that is both safe and easy to use.

More particularly, it is an object of the invention to provide a highly versatile lifting apparatus which can be used to lift automobile engines in a precise and highly controllable manner so as not to damage either the engine or the engine compartment of the vehicle as the engine is being removed.

Another object of the invention is to provide a lifting apparatus of the aforementioned character which is portable and can be easily positioned at a desired location over the engine compartment of an automobile.

Another object of the invention is to provide a lifting apparatus as described in the preceding paragraphs which is highly stable and can be easily manipulated to lift an object along a variety of lifting paths from side to side and from front to rear of the engine compartment.

Another object of the invention is to provide a lifting apparatus which can be precisely controlled so as to closely regulate the rate of lifting.

Another object of the invention is to provide an engine hoist which can readily straddle most vehicles and which can provide adequate reach to enable safe and convenient lifting of the engine from the engine compartment.

Another object of the invention is to provide a device of the character described in the preceding paragraph which enables both angular and straight lifting of the engine using separate hydraulic lifting assemblies for increased safety should one of the hydraulic assemblies fail during use.

Another object of the invention is to provide a lifting cable for lifting the vehicle engine which depends from a carriage that is reciprocally movable along tracks which transversely span the upper lifting arms of the apparatus. In this way the lifting path can be varied to the right or left of center of the vehicle.

Still another object of the invention is to provide an engine hoist that provides a greater range of travel than is possible with conventional devices and is both durable and reliable in use.

BRIEF DESCRIPTION OF THE DRAWINGS

FIG. 5 is a rear elevational view of the apparatus of the invention.

FIG. 6 is a fragmentary rear elevational view similar to FIG. 5 but illustrating the top assembly portion of the apparatus in a lowered configuration.

DESCRIPTION OF ONE FORM OF THE INVENTION

Figure 1:
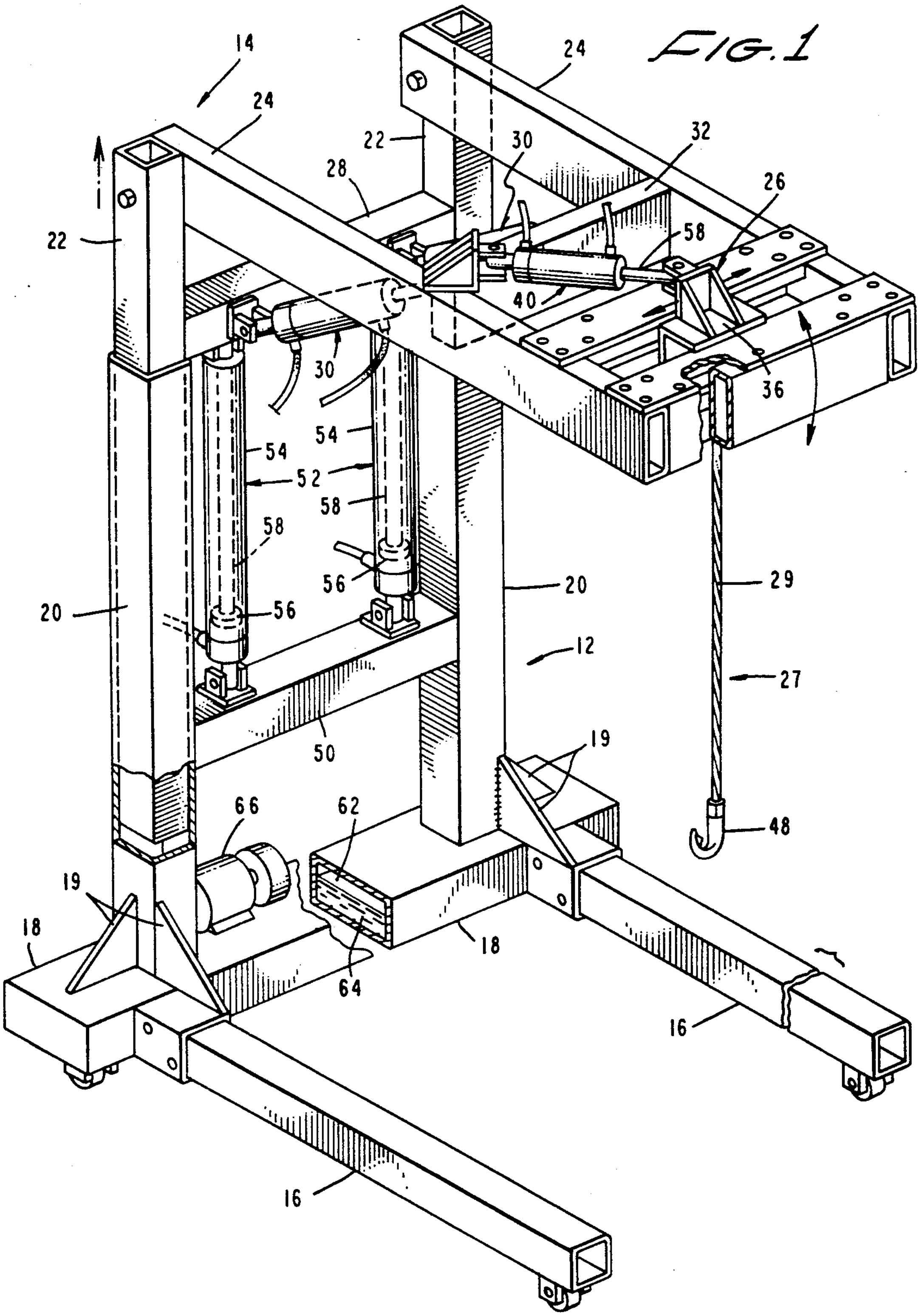
FIG. 1 is a generally perspective view of the lifting apparatus of the present invention.
Figure 2:
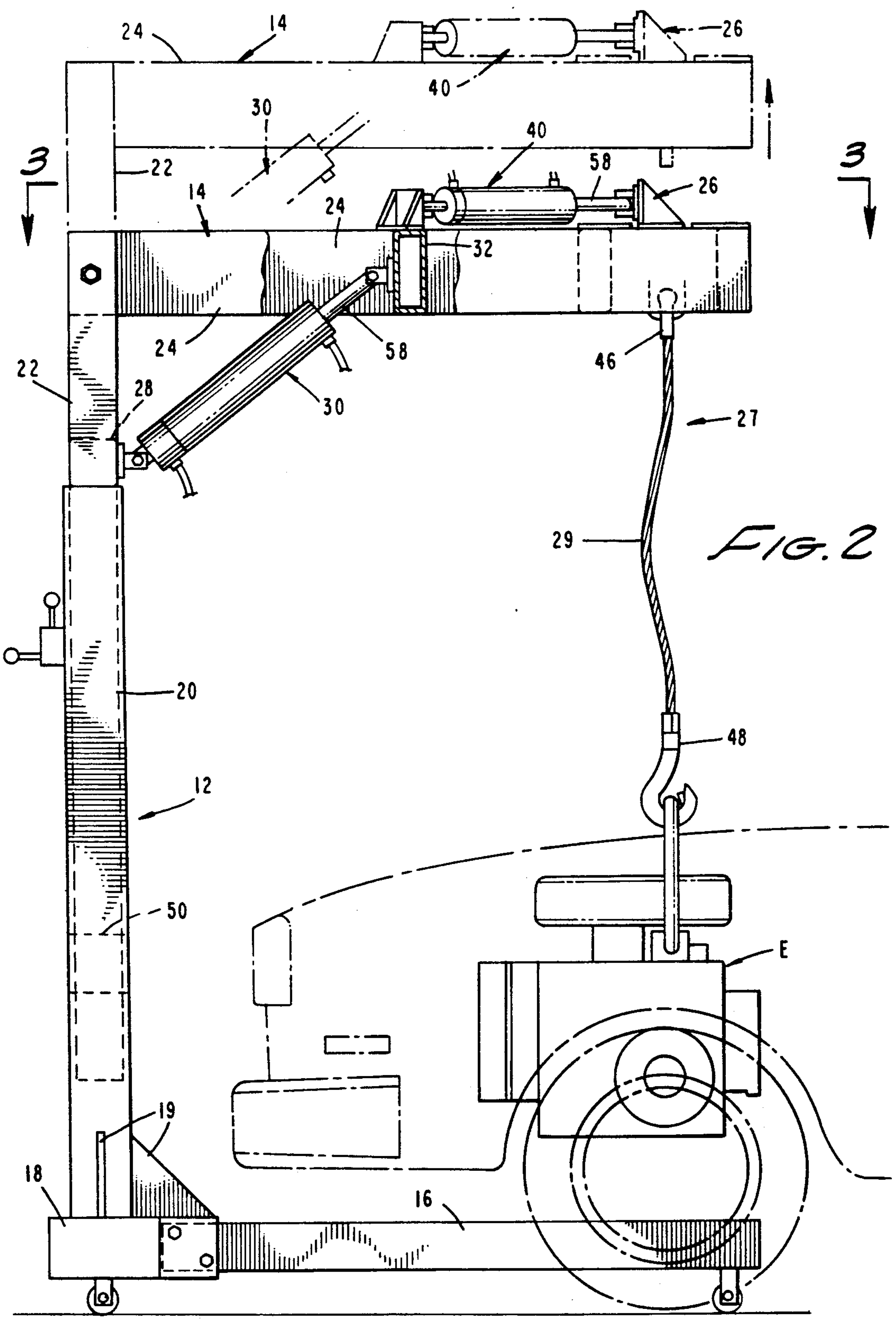
FIG. 2 is a side elevational view of the apparatus partly broken away to show internal construction.

Referring to the drawings and particularly to FIGS. 1 and 2, one form of the lift apparatus of the present invention is there illustrated. In this form of the invention, the apparatus comprises a base assembly generally designated by the numeral 12 and a top assembly generally designated by the numeral 14. The base assembly 12 includes a pair of spaced-apart, longitudinally extending members 16, a transverse member 18 connected to the longitudinally extending members 16, and a pair of transversally, spaced-apart, generally vertically extending members 20 connected to transverse member 18. Angle brackets 19 function to rigidly interconnect the members. As will be described in greater detail hereinafter, longitudinally extending members 16 are spaced apart a distance sufficient to accept therebetween the front end of an automobile when the apparatus is used as an engine hoist (see for example FIG. 2).

The top assembly 14, which is operably associated with the base assembly, comprises a pair of generally vertically extending members 22 and a pair of longitudinally extending top members or lifting arms 24 which are pivotally connected to members 22. The top assembly also includes a carriage assembly 26 which is disposed intermediate longitudinally extending members 24. As will be discussed in greater detail hereinafter, carriage assembly 26 is movable between first and second positions and includes connector means, shown here as a cable assembly 27, including a depending cable 29 for interconnection with the object to be lifted.

Vertically extending members 22 of the top assembly are telescopically received within upright members 20 of the base assembly. As can best be seen by referring to FIGS. 2, 5 and 6, top assembly 14 is movable between a first lower position (FIG. 6) and a second elevated position (FIG. 5) by lifting means connected to base assembly 12 for controllably lifting top assembly 14 in the manner shown in FIG. 5 and by the phantom lines shown in FIG. 2.

Figure 7:
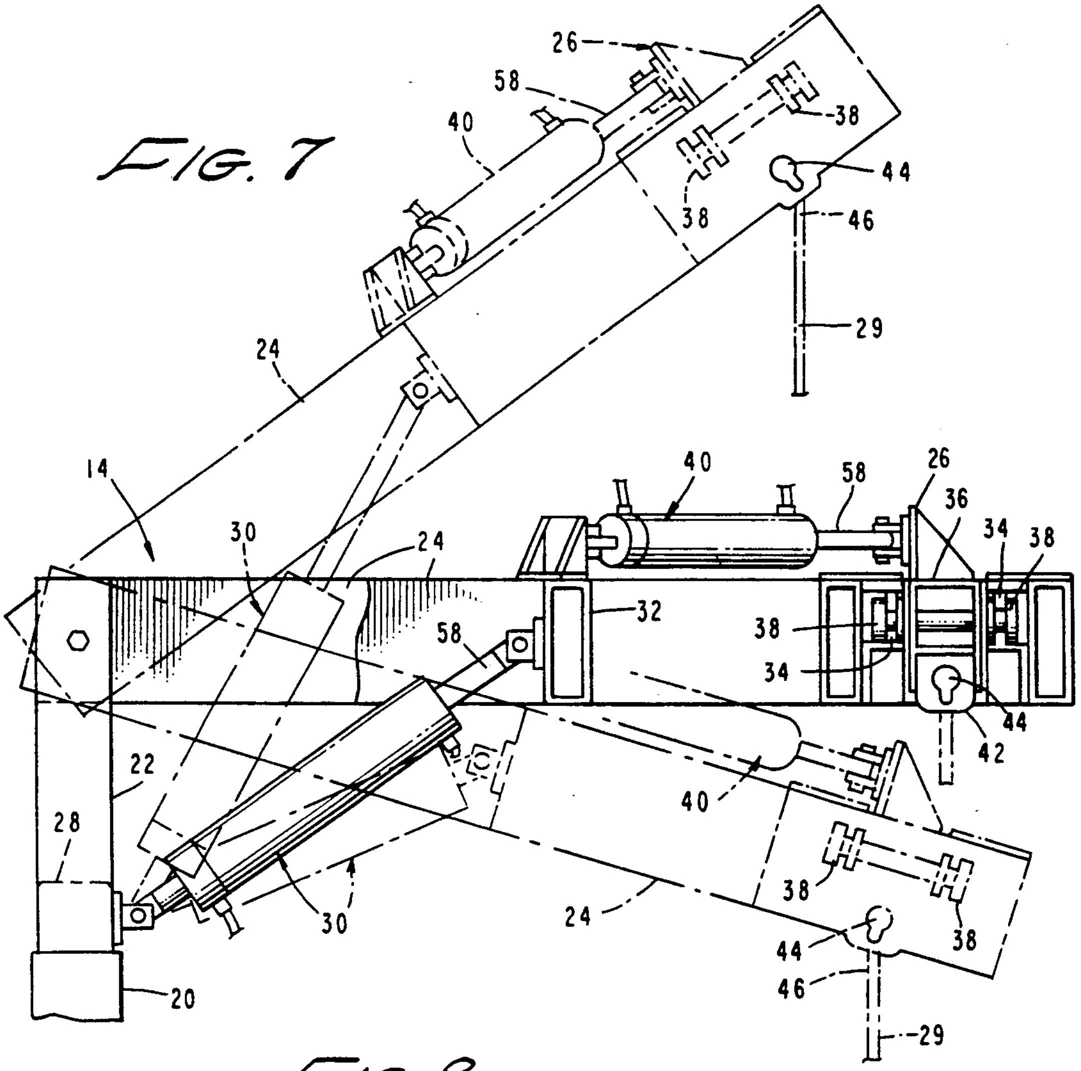
FIG. 7 is a fragmentary diagrammatic view of the top assembly portion of the apparatus illustrating the pivotal movement of the forwardly extending members of the top assembly of the apparatus.

Top assembly 14 further includes a transverse member 28 which extends between, and is connected to, vertically extending members 22. Connected to transverse member 28 are means for imparting pivotal movement to longitudinally extending members 24 of the top assembly 14. In the present embodiment of the invention, this means is provided in the form of a pair of hydraulic assemblies 30 which are disposed between transverse member 28 and a second transverse member 32 which is located intermediate longitudinally extending members 24 of the top assembly. As will be described in greater detail hereinafter, these hydraulic assemblies or devices 30 function to move members 24 pivotally upwardly and downwardly in the manner illustrated by the phantom lines in FIG. 7. Members 16, 18, 20, 22 and 24 are preferably constructed from tubular steel, however, any rigid structural material will suffice.

Figure 3:
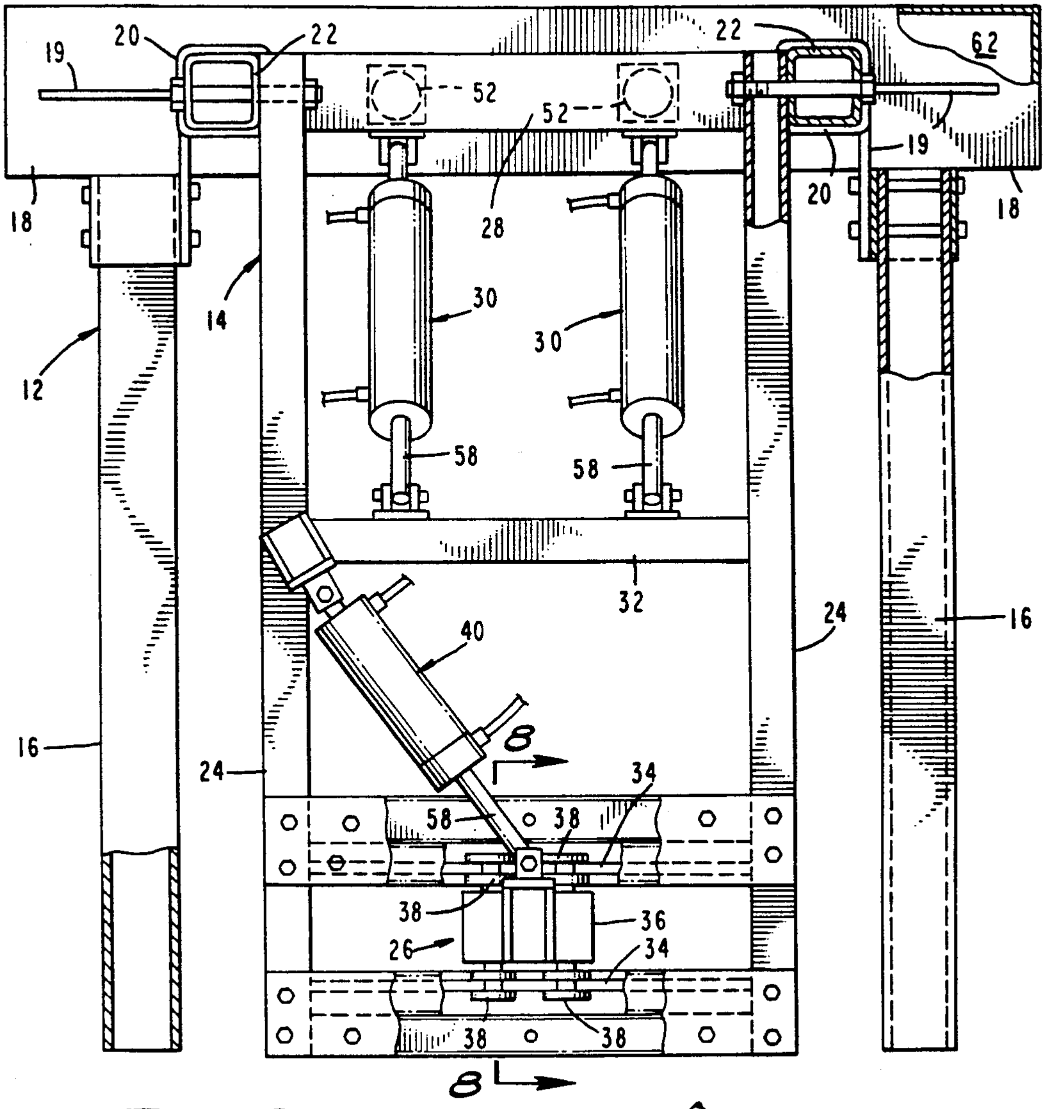
FIG. 3 is a top view taken along lines 3—3 of FIG. 2.
Figure 4:
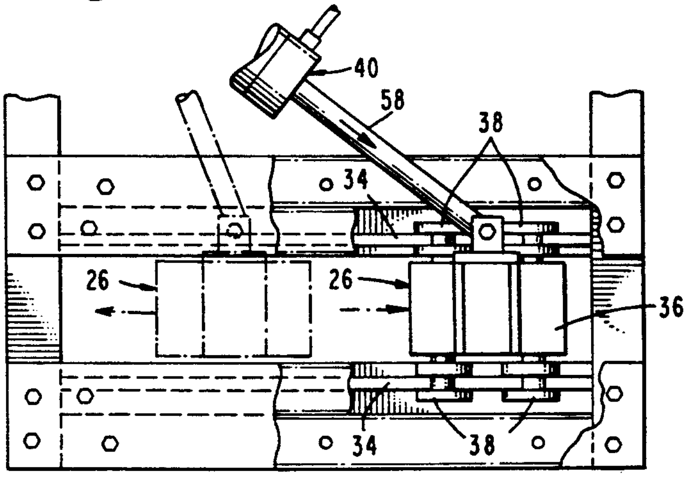
FIG. 4 is a fragmentary top view of the forward portion of the apparatus illustrating movement of the carriage of the apparatus between first and second positions.
Figure 8:
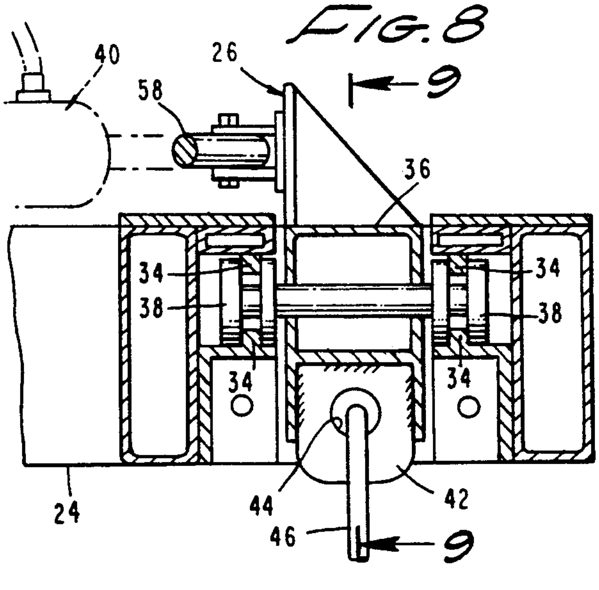
FIG. 8 is a cross-sectional view taken along lines 8—8 of FIG. 3.
Figure 9:
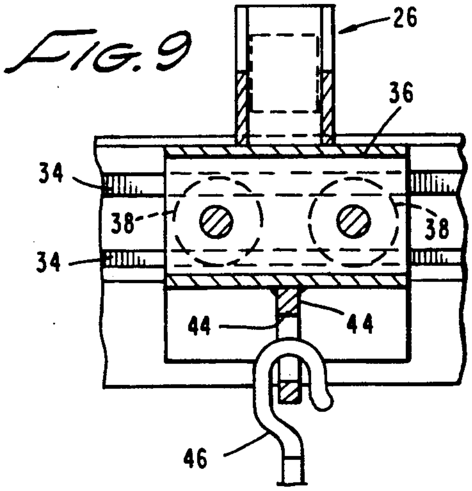
FIG. 9 is a cross-sectional view taken along lines 9—9 of FIG. 8.

Turning now to FIGS. 3, 4, 8 and 9, it can be seen that top assembly 14 further includes a pair of spaced-apart transverse tracks 34 which extend between members 24 of the top assembly near their forward ends (FIGS. 3 and 4). Tracks 34 rollably support a carriage 36 which comprises a part of the previously identified carriage assembly 26. As indicated in FIGS. 8 and 9, carriage 36 is provided with two pair of spaced-apart wheels 38 which roll along tracks 34 in the manner indicated by the phantom lines in FIG. 4. Drive means are provided to impart transverse movement to carriage 36 between the first and second positions. In the embodiment of the invention shown in the drawings, the drive means are provided in the form of a hydraulic device 40, the character of which will presently be described. As is also indicated in FIGS. 8 and 9, the carriage assembly includes a downwardly protruding member 42 which is provided with an eyelet 44 for use in connecting the connector means, or cable 29, to the carriage. In the present form of the invention, the connector means includes the elongated cable 29 having hooks 46 and 48 connected at either end of cable 28. As best seen in FIG. 9, hook 46 is removably receivable within eyelet 44 so that the connector means can be readily interconnected with the carriage assembly 26.

Turning once again to FIGS. 5 and 6, base assembly 12 further includes a transversely extending member 50 which is disposed between vertically extending members 20 at a location intermediate their ends. In the embodiment of the invention shown in the drawings, the lifting means for lifting the top assembly comprises a pair of hydraulic devices or assemblies 52 which are disposed intermediate transverse member 50 of the base assembly and transverse member 28 of the top assembly.

As indicated in the drawings, each of the previously identified hydraulic assemblies of the apparatus and of conventional construction and comprise a hydraulic cylinder 54 within which a piston 56 reciprocates in response to the urging of hydraulic fluid under pressure. Connected to each of the pistons 56 is a push rod 58, a portion of which also reciprocates within hydraulic cylinders 54. With this construction, the hydraulic cylinders 54, which comprise a part of the lifting means of the invention, are interconnected with transverse member 50 of the base assembly. As best seen in FIG. 6, the push rods 58 of the hydraulic devices are connected at their outer ends to transverse member 28 of top assembly 14. When the apparatus is in an at-rest condition as illustrated in FIGS. 1 and 6, pistons 56 are in their lower-most position within cylinders 54. However, when hydraulic fluid under pressure is introduced into the lower ends of the cylinders, the pistons 56 are forced upwardly in the manner shown in FIG. 5 which results in vertical upward movement of the top assembly from the at-rest position to the position shown in FIG. 5.

Each of the hydraulic devices of the apparatus of the present invention are of the general character described in the preceding paragraph and all are operated by an operating system the details of which will presently be described. As indicated in FIG. 10, the operating system includes a pump means and a plurality of inter-realated control valves for directing hydraulic fluid under pressure from a hydraulic reservoir to the particular hydraulic devices desired to be operated.

Turning once again to FIG. 1, a unique feature of the apparatus of the present invention resides in the fact that transverse structural member 18 include a fluid chamber 62 which contains the hydraulic fluid 64 that operates the various hydraulic assemblies. The control means of the apparatus of the invention is also of standard construction and includes a fluid pump 66 which is operably interconnected with fluid chamber 62 and functions through a series of valves to direct hydraulic fluid under pressure to a selected one, or a selected pair, of the hydraulic devices of the apparatus of the invention to cause the desired movement of the lifting arms of the apparatus.

Figure 10:
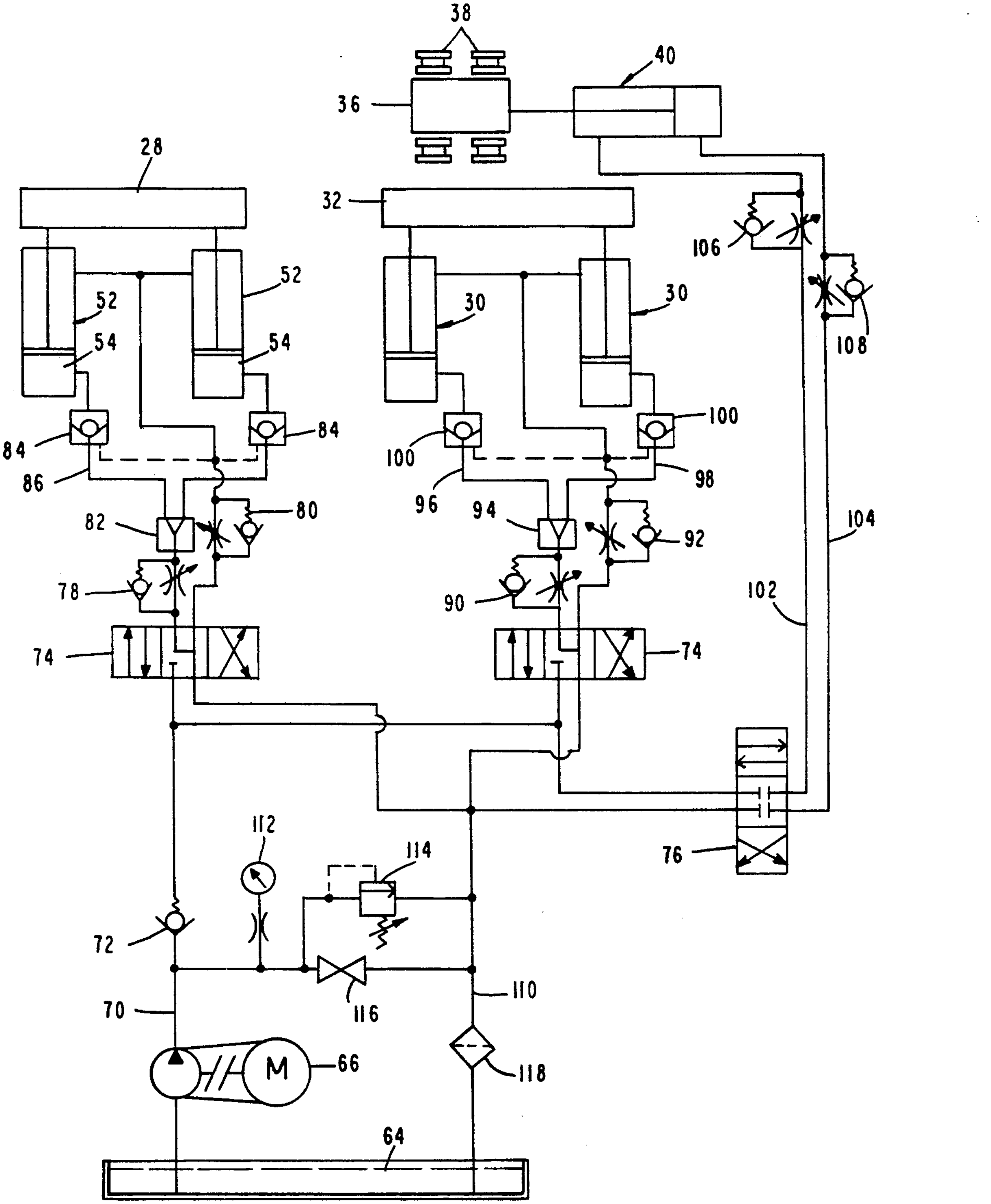
FIG. 10 is a generally schematic view illustrating the operating means of one form of the lifting apparatus of the invention.

Turning now to FIG. 10, the hydraulic control means or operating system for operating the various hydraulic assemblies of the apparatus is there illustrated. In FIG. 10, the previously identified fluid reservoir is designated 64 and the pump and motor assembly is designated 66. Fluid is pumped from reservoir 64 through a suitable conduit 70 via a check valve 72 to two sets of four-way control valves 74. One set of control valves 74 functions to operate hydraulic assemblies 52 which vertically lift the top assembly of the apparatus relative to the base assembly. The other set of four-way valves functions to operate hydraulic assemblies 30 which pivotally raise the forwardly extending members or lifting arms 24.

Also interconnected with fluid conduit 70 is another set of four-way valves 76 which function to operate hydraulic assembly 40 which drives carriage 36 reciprocally along tracks 34 of the top assembly.

Disposed between one set of four-way control valves 74 and hydraulic assemblies 52 are flow control valves 78 and 80 and a flow divider/combiner 82. Check valves 84 are located within flow control conduits 86 which interconnect flow divider/combiner 82 with the cylinders 54.

Disposed between the second set of four-way control valves 74 and hydraulic assemblies 30 are flow control valves 90 and 92 and flow divider/combiner 94. Fluid conduits 96 and 98 interconnect flow divider/combiner 94 with the hydraulic cylinders of hydraulic assemblies 30 via check valves 100.

In similar manner four-way control valves 76 are interconnected with hydraulic assembly 40 by means of fluid conduits 102 and 104 via flow control valves 106 and 108.

Located between fluid conduits 70 and fluid return conduit 110 are pressure gauge 112, relief valve 114 and shut-off valve 116. A filter 118 is provided in conduit 110 for purposes of filtering the hydraulic fluid which is returning to fluid reservoir 64 from the various hydraulic assemblies.

In operating the apparatus of the invention to lift an object such as an automobile engine, the apparatus is rolled into position proximate to the front of the automobile in the manner illustrated in FIG. 2. As previously mentioned, forwardly extending base arms 16 are transversely spaced a distance sufficient to permit convenient spanning of automobiles of standard width. Similarly members 16 are of sufficient length to permit more than adequate reach of the device so that cable 29 can be interconnected with the engine E at any desired location. During the time that the apparatus is being moved into position, the motor switch and all control valves are in the off, or at-rest position.

When the apparatus is in the correct position, and connector means or cable 29 is appropriately connected to the engine via connector hook 48, motor 66 is energized preparatory to the lifting operation. Normally at the starting position, members 24 extend substantially horizontally and carriage 36 is positioned substantially centrally of the apparatus. If the cable connecting point to the engine is off center, hydraulic assembly 40 is actuated so as to controllably move carriage 36 to a position wherein cable 29 is substantially vertically oriented.

Once carriage 36 is properly positioned relative to the engine, hydraulic assemblies 30 and 52 can be actuated separately or concurrently to accomplish the desired lifting of the engine. In situations where the engine can be lifted directly upwardly from the engine compartment, only hydraulic assemblies 52 need be operated. However, in those instances where it is necessary to carefully work the engine upwardly and either forwardly or rearwardly of the engine compartment, hydraulic assemblies 30 are also utilized to cause pivotal movement of upper arms 24 relative to vertical members 22 of the top assembly. It may also be necessary during the lifting operation to move carriage 36 in one direction or another so that the engine will safely clear the engine compartment as it is raised upwardly by hydraulic assemblies 30 and 52. It is this unique ability of the apparatus to independently or simultaneously lift an object at controlled rates along various selected paths that serves to clearly distinguish the apparatus of the present invention from similar lifting apparatus of the character found in the prior art.

Once the engine or other object has been lifted using the apparatus of the invention, it can be lowered by simply reversing the lifting operating described in the preceding paragraphs. Where the apparatus is used as an engine hoist, after the necessary work has been accomplished on the engine, the apparatus can be conveniently used to expeditiously replace the engine within the engine compartment of the automobile. Once again the novel multiple path descent feature of the invention, which is made possible by the unique cooperative interaction of hydraulic assemblies 30 and 52 as well as hydraulic assembly 40 permits the engine to be carefully worked into position within the engine compartment.

The various components which make up the hydraulic control system of the apparatus are well known to those skilled in the art and are readily commercially available. Similarly, the manner of interconnecting these components to provide the control system shown in FIG. 10 is well understood by those working in the hydraulic field. Accordingly, the details of interconnection, operation and interaction of the various hydraulic components of the apparatus need not be discussed herein.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A lifting apparatus for lifting an object, comprising:

(a) a base assembly including;
- (i) a pair of spaced apart, longitudinally extending members;
- (ii) a transverse member connected to said longitudinally extending members; and
- (iii) a pair of spaced apart, generally vertically extending members connected to said transverse member;

(b) a top assembly operably associated with said base assembly, said top assembly comprising:
- (i) a pair of generally vertically extending members connected to said base assembly for movement between first and second positions;
- (ii) a pair of top members extending outwardly from and pivotally connected to said generally vertically extending members;
- (iii) a carriage carried by said top members for transverse movement between first and second positions;
- (iv) connector means connected to said carriage for interconnection with the object to be lifted; and
- (v) means for imparting pivotal movement to said top members relative to said generally vertically extending members; and (c) lifting means connected to said base assembly for controllably lifting said top assembly; and (d) drive means for imparting transverse movement to said carriage, said drive means comprising a hydraulic means mounted on said top members and operably interconnected with said carriage for moving said carriage between said first and second positions.

2. A lifting apparatus as defined in claim 1 in which said carriage includes rollers and in which said top assembly further includes a pair of transverse tracks spanning said longitudinally extending members for engagement with said rollers of said carriage.

3. A lifting apparatus as defined in claim 1 in which said base assembly further includes a transverse member spanning said generally vertically extending members and in which said lifting means comprises a pair of hydraulic cylinders connected to said transverse member.

4. A lifting apparatus as defined in claim 1 in which said top assembly further includes a support member spanning said generally vertically extending members and in which said means for imparting pivotal movement to said top members of said top assembly comprise a pair of hydraulic cylinders connected to said support member.

5. A lifting apparatus as defined in claim 1 in which said base assembly further includes roller means for rollably moving said base assembly.

6. A lifting apparatus for lifting an object comprising:

(a) a base;

(b) a pair of upright columns connected to said base;

(c) a support member spanning said upright columns;

(d) a top assembly operably associated with said upright columns, said top assembly comprising:

(i) a pair of generally vertically extending members slidably connected to said upright columns for movement between first and second positions;

(ii) a pair of top members extending outwardly from and pivotably connected to said generally vertically extending members;

(iii) a pair of tracks spanning said top members;

(iv) a carriage rollably carried on said tracks for movement between first and second positions;

(v) connector means connected to said carriage for interconnection with the object to be lifted;

(vi) drive means for moving said carriage along said tracks between said first and second position said drive means comprising hydraulic means for rollably moving said carriage along said tracks;

(vii) a transverse member spanning said generally vertically extending members;

(viii) lifting means connected to said transverse member of said top assembly for imparting pivotal movement to said longitudinally extending members of said top assembly; and (e) top assembly lifting means for controllably lifting said top assembly.

7. A lifting apparatus as defined in claim 6 in which said base includes surface engaging rollers for rollably moving said base along a surface.

8. A lifting apparatus as defined in claim 6 in which said lifting means comprises a pair of hydraulic devices connected to said transverse member of said top assembly.

9. A lifting apparatus as defined in claim 8 in which said top assembly lifting means comprises a pair of hydraulic devices connected to said support member spanning said upright columns connected to said base.

10. An engine hoist for lifting an engine, comprising:

(a) a base, including roller means for rollable movement of said base;

(b) a pair of upright columns connected to said base;

(c) a support member disposed intermediate said upright columns;

(d) a top assembly operably associated with said upright columns, said top assembly comprising:

(i) a pair of generally vertically extending members telescopically receivable within said upright columns for movement therewithin between first and second positions;

(ii) a first transverse member disposed intermediate said vertically extending members;

(iii) a pair of members extending outwardly from and pivotably connected to said generally vertically extending members;

(iv) a pair of transversely extending tracks disposed intermediate said longitudinally extending members;

(v) a carriage rollably carried on said tracks for movement between first and second positions;

(vi) a cable connected to said carriage at one end and having a hook at the other end for interconnection with the object to be lifted;

(vii) hydraulic means for moving said carriage along said tracks between said first and second position;

(viii) a second transverse member spanning said generally vertically extending members;

(ix) a pair of hydraulic devices connected to said first transverse member of said top assembly for imparting pivotal movement to said top members of said top assembly; and (e) top assembly lifting means for controllably lifting said top assembly, said lifting means comprising a pair of hydraulic devices disposed intermediate said first and second transverse members.

11. An engine hoist as defined in claim 10 further including operating means operably associated with said hydraulic devices for operating said hydraulic devices.

12. An engine hoist as defined in claim 10 in which said base includes a pair of transversely spaced, longitudinally extending members and a transverse base member interconnected to said longitudinally extending members.

13. An engine hoist as defined in claim 12 in which said transverse base member includes a chamber for containing hydraulic fluid.

14. An engine hoist as defined in claim 13 in which said operating means includes pump means carried by said base for controllably pumping hydraulic fluid from said chamber to said hydraulic devices.

* * * * *